(12) United States Patent
Rose

(10) Patent No.: US 7,131,118 B2
(45) Date of Patent: Oct. 31, 2006

(54) WRITE-THROUGH CACHING A JAVA® LOCAL VARIABLE WITHIN A REGISTER OF A REGISTER BANK

(75) Inventor: Andrew Christopher Rose, Cambridge (GB)

(73) Assignee: ARM Limited, Cambridge (GB)

( * ) Notice: Subject to any disclaimer, the term of this patent is extended or adjusted under 35 U.S.C. 154(b) by 609 days.

(21) Appl. No.: 10/201,956

(22) Filed: Jul. 25, 2002

(65) Prior Publication Data

US 2004/0019880 A1    Jan. 29, 2004

(51) Int. Cl.
*G06F 9/44* (2006.01)
*G06F 9/30* (2006.01)
*G06F 21/00* (2006.01)
*G06F 12/00* (2006.01)

(52) U.S. Cl. .................. 717/148; 717/118; 712/202; 711/6

(58) Field of Classification Search ........ 717/118–148; 712/202–214, 248; 711/6
See application file for complete search history.

(56) References Cited

U.S. PATENT DOCUMENTS

| | | | |
|---|---|---|---|
| 3,889,243 A | 6/1975 | Drimak | |
| 4,236,204 A | 11/1980 | Groves | |
| 4,587,632 A | 5/1986 | Ditzel | |
| 4,922,414 A | 5/1990 | Holloway et al. | |
| 4,969,091 A | 11/1990 | Muller | |
| 5,136,696 A | 8/1992 | Beckwith et al. | |
| 5,455,775 A | 10/1995 | Huber et al. | |
| 5,619,665 A | 4/1997 | Emma | |
| 5,638,525 A | 6/1997 | Hammond et al. | |
| 5,659,703 A | 8/1997 | Moore et al. | |
| 5,740,461 A | 4/1998 | Jaggar | |
| 5,742,802 A | 4/1998 | Harter et al. | |
| 5,752,035 A | 5/1998 | Trimberger | |
| 5,784,584 A | 7/1998 | Moore et al. | |
| 5,809,336 A | 9/1998 | Moore et al. | |
| 5,838,948 A | 11/1998 | Bunza | |
| 5,875,336 A | 2/1999 | Dickol et al. | |
| 5,892,966 A | 4/1999 | Petrick et al. | |
| 5,925,123 A | 7/1999 | Tremblay et al. | |
| 5,926,832 A | 7/1999 | Wing et al. | |
| 5,937,193 A | 8/1999 | Evoy | |
| 5,953,741 A | 9/1999 | Evoy et al. | |
| 6,003,126 A | 12/1999 | Huynh et al. | |
| 6,009,499 A | 12/1999 | Koppala | |
| 6,009,509 A | 12/1999 | Leung et al. | |

(Continued)

OTHER PUBLICATIONS

H. Stone, Chapter 12—"A Pipeline Push-Down Stack Computer", 1969, pp. 235-249.

(Continued)

*Primary Examiner*—Tuan Dam
*Assistant Examiner*—Chuck Kendall
(74) *Attorney, Agent, or Firm*—Nixon & Vanderhye P.C.

(57) ABSTRACT

In a data processing apparatus 2 having a first mode of operation in which JAVA® bytecodes 46, 48 specify the processing operations and a second mode of operation in which other instructions specify the processing operations. In order to speed operation, the JAVA® Local Variable 0, or another such variable, is stored within a register of a register bank 14 to be available for rapid access. This storage is in a write-through manner such that reads of the value will be directly serviced from the register R4 and writes to the data value will be made in both the register R4 and back in the original memory location for that data value as determined by the JAVA® Virtual Machine.

12 Claims, 5 Drawing Sheets

U.S. PATENT DOCUMENTS

| | | | |
|---|---|---|---|
| 6,014,723 | A | 1/2000 | Tremblay et al. |
| 6,021,469 | A | 2/2000 | Tremblay et al. |
| 6,026,485 | A | 2/2000 | O'Connor et al. |
| 6,031,992 | A | 2/2000 | Cmelik et al. |
| 6,038,643 | A | 3/2000 | Tremblay et al. |
| 6,070,173 | A | 5/2000 | Huber et al. |
| 6,081,665 | A * | 6/2000 | Nilsen et al. ............... 717/116 |
| 6,088,786 | A | 7/2000 | Feierbach et al. |
| 6,122,638 | A | 9/2000 | Huber et al. |
| 6,125,439 | A | 9/2000 | Tremblay et al. |
| 6,148,391 | A | 11/2000 | Petrick |
| 6,295,641 | B1 * | 9/2001 | Beadle et al. ............... 717/148 |
| 6,298,434 | B1 | 10/2001 | Lindwer |
| 6,317,872 | B1 | 11/2001 | Gee et al. |
| 6,338,134 | B1 | 1/2002 | Leung et al. |
| 6,349,377 | B1 | 2/2002 | Lindwer |
| 6,374,286 | B1 | 4/2002 | Gee et al. |
| 6,606,743 | B1 | 8/2003 | Raz et al. |
| 6,654,875 | B1 * | 11/2003 | Hartnett et al. ............. 712/211 |

OTHER PUBLICATIONS

C. Glossner et al, "Delft-Java Link Translation Buffer", Aug. 1998.
N. Vijaykrishnan et al, "Object-Oriented Architectural Support For a Java Processor" 1998, pp. 330-355.
C. Glossner et al, "The Delft-Java Engine: An Introduction", Aug. 1997.
K. Ebcioglu et al, "A Java ILP Machine Based On Fast Dynamic Compilation", Jan. 1997, pp. 1-13.
A. Wolfe, "First Java-specific chip takes wing" EETimes—1997.
Y. Patt, *Introduction to Computer Systems From Bits and Gates to C and Beyond*, 1999, pp. 1-517.
M. Ertl, "Stack Caching for Interpreters" 1994, pp. 1-13.
M. Ertl, "Stack Caching for Interpreters" 1995, pp. 1-13.
M. Ertl, "Implementation of Stack-Based Languages on Register Machines" Apr. 1996, pp. 1-4.
J. O'Connor et al, "PicoJava-I: The Java Virtual Machine in Hardware" *IEEE Micro* A Case for Intelligent RAM, Mar./Apr. 1997, pp. 45-53.
K. Andrews et al, "Migrating a CISC Computer Family Onto RISC Via Object Code Translation" 1992, pp. 213-222.
"PicoJava I Microprocessor Core Architecture" Oct. 1996, pp. 1-8, Sun Microsystems.
M. Ertl, "A New Approach to Forth Native Code Generation" 1992.
M. Maierhofer et al, "Optimizing Stack Code" 1997, p. 19.
D. Ungar et al, "Architecture of SOAR: Smalltalk on a RISC" The 11th Annual International Symposium on Computer Architecture, Jun. 1984, pp. 188-197.
O. Steinbusch, "Designing Hardware to Interpret Virtual Machine Instructions" Feb. 1998, pp. 1-59.
R. Kapoor et al, "Stack Renaming of the Java Virtual Machine" Dec. 1996, pp. 1-17.

A. Yonezawa et al, "Implementing Concurrent Object-Oriented Languages in Multicomputers" *Parallel and Distributed Technology* (*Systems and Applications*) May 1993, pp. 49-61.
C. Hsieh et al; "Java Bytecode to Native Code Translation; The Caffeine Prototype and Preliminary Results" IEEE/ACM International Symposium on Microarchitecture, Dec. 1996, pp. 90-97.
Y. Patt et al, *Introduction to Computer Systems From Bits and Gates to C and Beyond*, 2001, pp. 1-526.
Sun Microsystems PicoJava Processor Core Data Sheet, Dec. 1997, pp. 1-11.
H. McGhan et al, PicoJava A Direct Execution Engine for Java Bytecode, Oct. 1998, pp. 22-26.
C. Glossner et al, "Parallel Processing" Euro-Par 1997: Passau, Germany, Aug. 1997.
Y. Patt, *Introduction to Computer Systems From Bits and Gates to C and Beyond*, 1999, pp. 10-12 & 79-82.
Espresso—The High Performance Java Core Specification, Oct. 2001, pp. 1-33, Aurora VLSI, Inc.
J. Gosling, "Java Intermediate Bytecodes" 1995, pp. 111-118.
P. Koopman, Jr. "Stack Computers The New Wave" 1989, pp. 1-234.
M. Mrva et al, "A Scalable Architecture for Multi-Threaded JAVA Applications" Design Automation and Test in Europe, Feb. 1998, pp. 868-874.
L. Chang et al, "Stack Operations Folding in Java Processors" *IEEE Proc.—Comput. Digit. Tech.*, vol. 145, No. 5, pp. 333-340 Sep. 1998.
L. Ton et al, Proceedings of the '97 International Conference on Parallel and Distributed Systems, "Instruction Folding in Java Processor", pp. 138-143, Dec. 1997.
K. Buchenrieder et al., "Scalable Processor Architecture for Java With Explicit Thread Support" *Electronics Letters* vol. 33, No. 18, pp. 1532+, Aug. 1997.
C. Chung et al, Proceedings of the '98 International Conference on Parallel and Distributed Systems, "A Dual Threaded Java Processor for Java Multithreading" pp. 693-700, Dec. 1998.
I. Kazi et al, "Techniques for Obtaining High Performance in Java Programs" Sep. 2000, pp. 213-240.
R. Kieburtz, "A RISC Architecture for Symbolic Computation" 1987, pp. 146-155.
M. Berekovic et al, "Hardware Realization of a Java Virtual Machine for High Performance Multimedia Applications" *Signal Processing Systems SIPS 98*, pp. 479-488, 1997.
P. Deutsch, "Efficient Implementation of the Smalltalk-80 System" 1983, pp. 297-302.
"Rockwell Produces Java Chip" Sep. 1997, CNET news.com.
Y. Patt et al, *Introduction to Computing Systems from Bits and Gates to C and Beyond*, 2001, pp. 1-16, 91-118 & 195-209.

* cited by examiner

WRITE-THROUGH CACHING A JAVA® LOCAL VARIABLE WITHIN A REGISTER OF A REGISTER BANK

BACKGROUND OF THE INVENTION

1. Field of the Invention

This invention relates to data processing systems. More particularly, this invention relates to data processing systems operable in a first mode to perform processing operations specified by JAVA® bytecodes and operable in a second processing mode to perform processing operations specified by other instructions.

2. Description of the Prior Art

It is known to provide data processing systems which can operate in a first mode to perform data processing operations specified by JAVA® bytecodes and operable in a second mode to perform data processing operations specified by other instructions. An example of such a system is described in United States Pending Patent Application entitled Unhandled Operation Handling In Multiple Instruction Set Systems and filed on 2 May 2002 and International Published Publication No. WO-A-02/29563. The disclosure of these documents is incorporated herein by reference.

U.S. Pat. No. 6,332,215 discloses a system which translates JAVA® bytecodes into native processor instructions and stores a copy of a JAVA® Local Variable within a register of the register bank of the native processor.

In the context of hardware acceleration of JAVA® bytecode execution measures which can improve execution speed are strongly desirable.

SUMMARY OF THE INVENTION

Viewed from one aspect the present invention provides apparatus operable in a first mode to perform processing operations specified by JAVA® bytecodes and operable in a second mode to perform processing operations specified by other instructions, said apparatus comprising:

a register bank operable to store data values to be manipulated;

processing logic operable to perform processing operation upon data values stored in said register bank; and a JAVA® bytecode decoder operable in said first mode to store a copy of a JAVA® Local Variable held in a memory location within a register of said register bank; wherein said JAVA® bytecode decoder is operable when decoding a JAVA® bytecode which reads said JAVA® Local Variable to read said JAVA® Local Variable from said register and is operable when decoding a JAVA® bytecode which writes said JAVA® Local Variable to write said JAVA® Local Variable to said register and to said memory location.

The invention recognises that a significant performance gain can be made by caching one or more JAVA® Local Variables in a register of the register bank of the system using a write-through strategy. The write-through strategy helps to provide transparency to the programmer of the caching of the JAVA® Local Variable by the system since the copy held in memory will always be up-to-date. Furthermore, the technique also exploits the recognition that in practice reads from at least some types of JAVA® Local Variable will be many times more common than writes to the JAVA® Local Variable and accordingly the performance gains made in being able to read this from a copy held in a register will significantly outweigh the overheads associated with having to write-through changes to this value and provide control circuitry for controlling such operation.

In order to improve the transparency of the current technique to programmers, preferred embodiments serve to automatically load the JAVA® Local Variable to the register when entering the first mode and/or when returning from an exception handling operation to the first mode.

It will be appreciated by those in the field that it is known to provide processing status variables to represent processing status of the system for use during context switches, such as exception handling operation and the like. With this type of operation, preferred embodiments of the invention serve to associate the processing status variables corresponding to those when an exception occurred with any load operation performed for the JAVA® Local Variable when returning from the exception should a further exception occur during the load operation. As the load operation is associated with the change of state to the first mode rather than truly with the load operation itself, then the processing status variables should correspond to the target being returned to rather than the source.

It will be appreciated that one or more different JAVA® Local Variables may be write-through cached within a register in accordance with the present technique. However, particularly preferred embodiments serve to store within a register a pointer to the current JAVA® method. Such a pointer is very frequently read, infrequently written and is highly performance critical. Accordingly, the present technique provides a significant performance gain that justifies the additional control circuitry and the dedicated use of a register in the register bank to store the pointer.

Viewed from another aspect the present invention provides a method of controlling a data processing apparatus to be operable in a first mode to perform processing operations specified by JAVA® bytecodes and to be operable in a second mode to perform processing operations specified by other instructions, said method comprising the steps of:

storing data values to be manipulated in a register bank;

performing processing operation upon data values stored in said register bank; and in said first mode, storing a copy of a JAVA® Local Variable held in a memory location within a register of said register bank; wherein when decoding a JAVA® bytecode which reads said JAVA® Local Variable, reading said JAVA® Local Variable from said register and, when decoding a JAVA® bytecode which writes said JAVA® Local Variable, writing said JAVA® Local Variable to said register and to said memory location.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
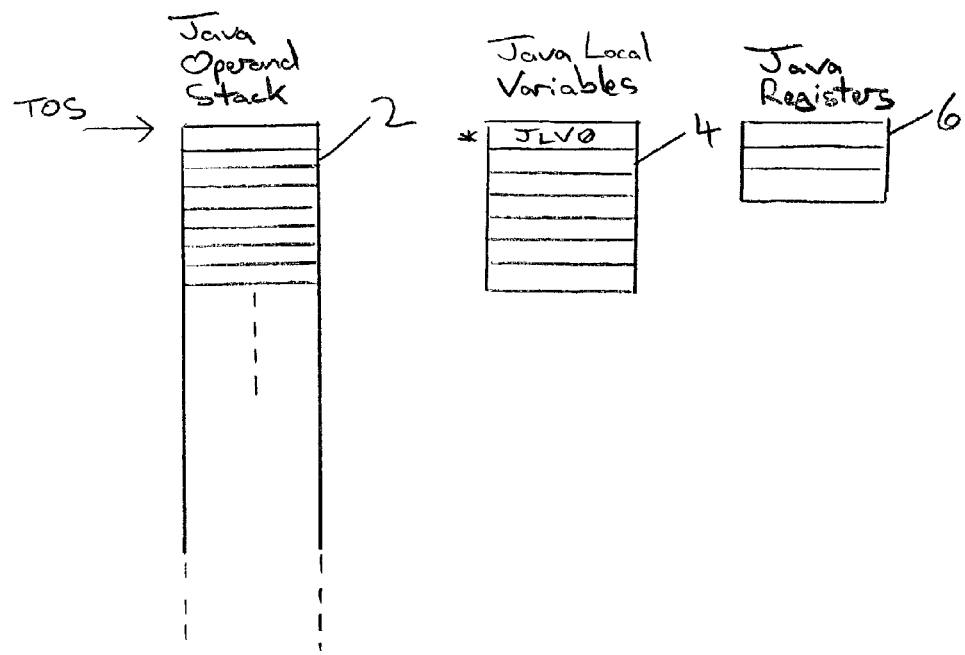
FIG. 1 schematically illustrates a JAVA® Virtual Machine on which JAVA® bytecodes can be considered to execute.

FIG. 1 schematically illustrates a JAVA® Virtual Machine as is known in the prior art. Such a JAVA® Virtual Machine includes a JAVA® Operand Stack 2 for storing working data values, storage for JAVA® Local Variables 4 and storage for JAVA® Registers 6. Processing logic 8 is deemed to be present within the JAVA® Virtual Machine which will perform the data processing operations specified by the JAVA® bytecodes.

The JAVA® Local Variable storage 4 stores a number of data values that are typically associated with the internal control of the JAVA® program concerned. In particular, the JAVA® Local Variable 0 typically stores a pointer to the current JAVA® method being executed. The value of this variable is frequently needed to access various parameters associated with execution of the current JAVA® method.

Figure 2:
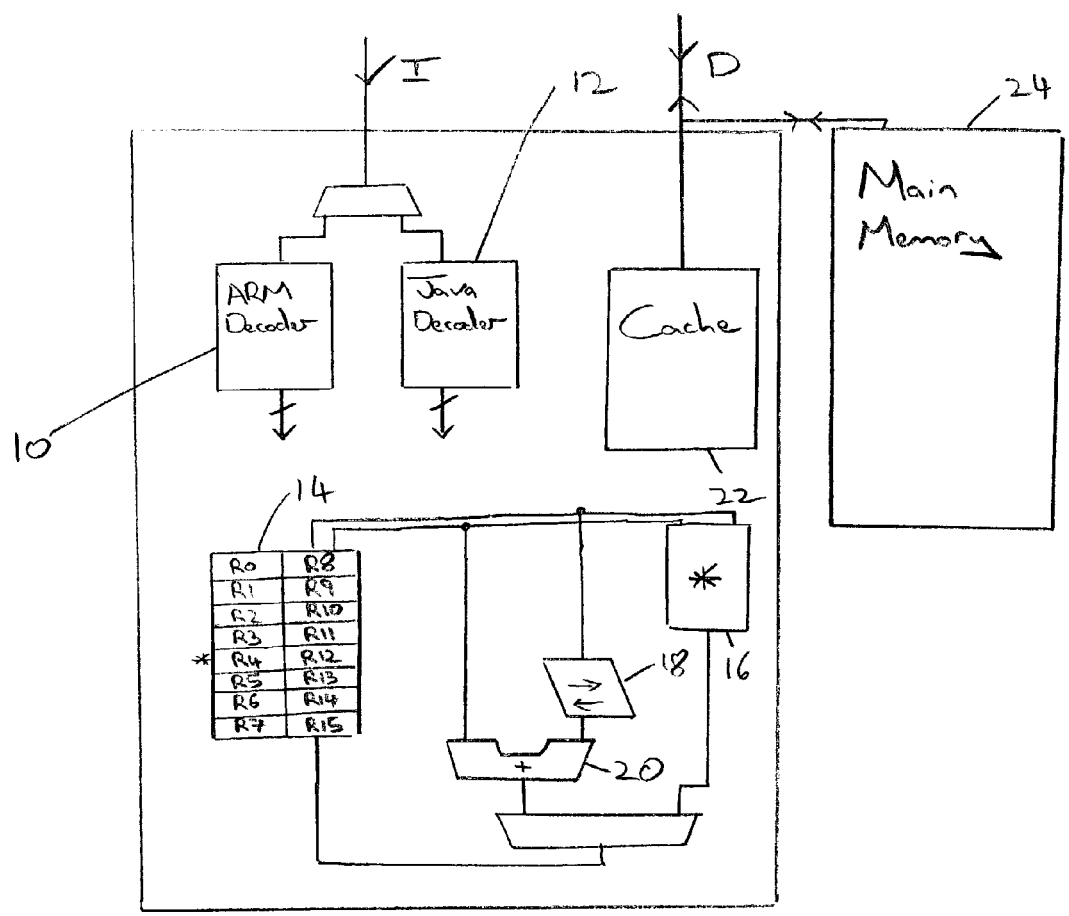
FIG. 2 schematically illustrates a data processing system having a first mode for performing data processing operation specified by JAVA® bytecodes and a second mode for performing data processing operations specified by ARM instructions.

FIG. 2 schematically illustrates a data processing apparatus 2 which is operable in a first mode to perform processing operations specified by JAVA® bytecodes and is operable in a second mode to perform data processing operation specified by other instructions, in particular, instructions to be executed are selectively supplied to either an ARM instruction decoder 10 or a JAVA® bytecode decoder 12. These respective decoders 10, 12 then produce control signals which control the processing circuits within the system. The circuits include a register bank 14 as well as processing logic such as a multiplier 16, a shifter 18 and an adder 20 for manipulating data values stored within the register bank 14. A cache memory 22 and a main memory 24 are also provided to store data values. In practice with this type of architecture, a data value stored within a register may be directly manipulated by the processing logic 16, 18, 20. The data value stored in the cache memory 22 may be rapidly retrieved to a register from where it may be manipulated. A data value which is not cached within the cache memory 22 but is stored in the main memory 24 must be subject to a relatively slower access prior to being stored in the register from where it may be manipulated.

As is known from the above mentioned patent application and published patent application, it is known to cache operand stack values within a number of registers after the register bank 14, namely, registers R0, R1, R2 and R3. The present technique utilises the JAVA® decoder 12 to also store a copy of the JAVA® Local Variable 0 within the register R4 of the register bank 14. This storage of the JAVA® Local Variable 0 occurs in the first mode operation, i.e. the JAVA® bytecode decoding mode, and the data value is written into the register R4 on entry to this mode. Thereafter, read accesses to this data value may be made directly from the register R4. Writes to the data value are made in a write-through manner, i.e. the data value stored in the register R4 is changed and a write operation is also performed which changes the corresponding data value in the memory location whether that be within the cache memory 22 or the main memory 24, or both.

Figure 3:
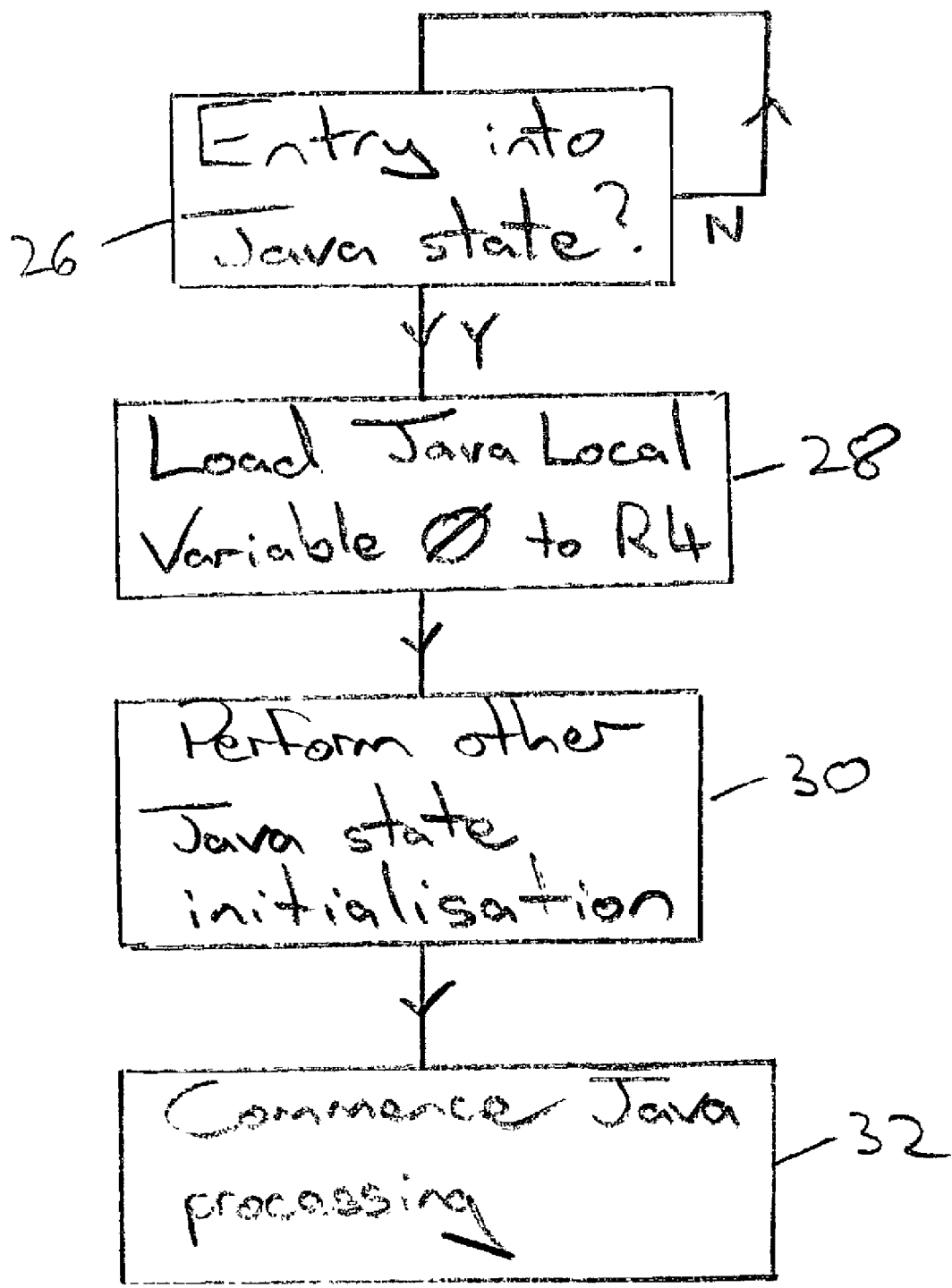
FIG. 3 is a flow diagram schematically illustrating some of the processing operations performed when entering the first mode.

FIG. 3 is a flow diagram schematically illustrating part of the processing operations performed and controlled by the JAVA® decoder 12 when entering the JAVA® bytecode decoding state. At step 26 the system waits until such a state is entered. At step 28, the JAVA® decoder 12 controls the various circuits, such as a load store unit or the like (not illustrated) to load the JAVA® Local Variable 0 stored in its memory location into the register R4. At step 30 other JAVA® state initialisation operations are performed, such as initialising the JAVA® operand stack. At step 32 JAVA® bytecode processing is commenced.

Figure 4:
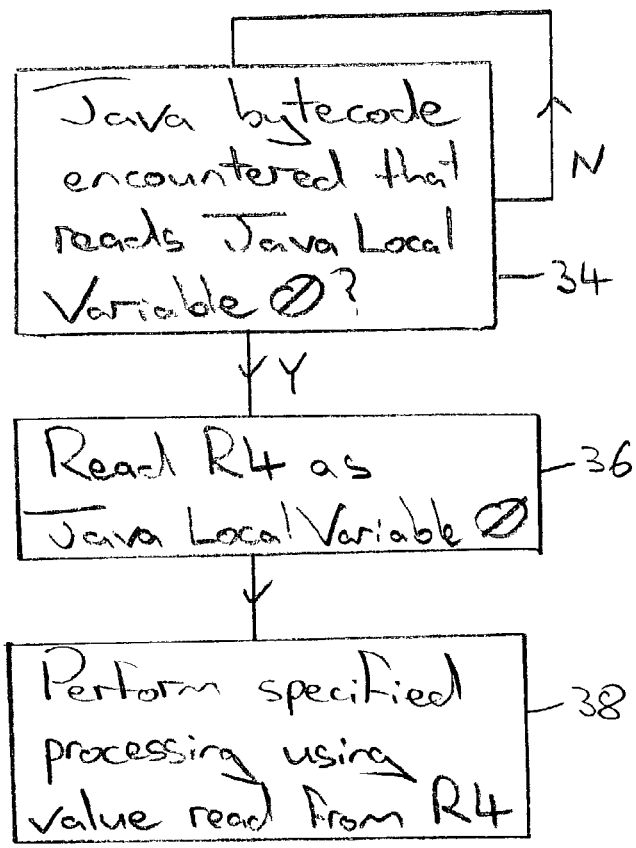
FIG. 4 schematically illustrates some of the processing operations performed when reading a write-through cached JAVA® Local Variable.

FIG. 4 is a flow diagram schematically illustrating part of the processing operations controlled by the JAVA® decoder 12 when executing a JAVA® bytecode which requires a read of JAVA® Local Variable 0. At step 34 execution of such a bytecode is identified. At step 36 the value from R4 is read as that JAVA® Local Variable 0 and at step 38 the processing specified by the bytecode being decoded is performed using the read value from R4. Since the JAVA® Local Variable 0 is directly available within a register, high speed access is gained to this value and accordingly overall processing speed is improved.

Figure 5:
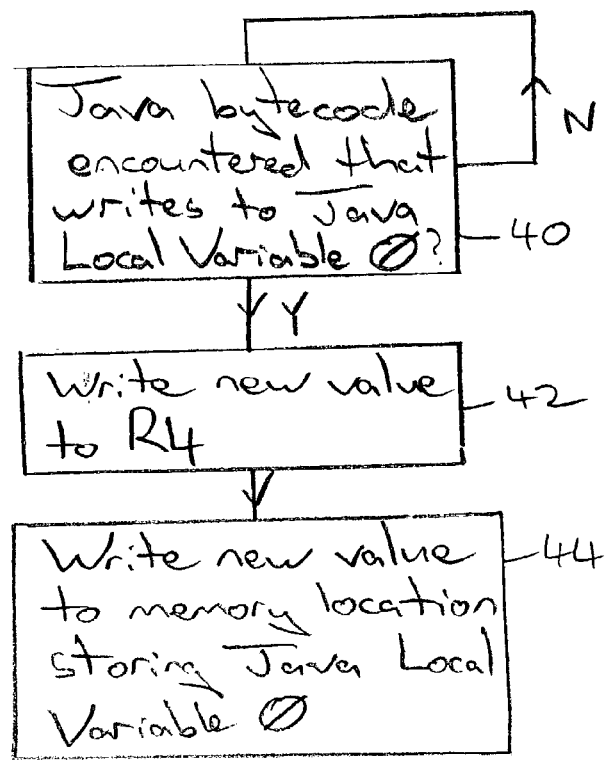
FIG. 5 schematically illustrates some of the processing operations performed when writing a write-through cached JAVA® Local Variable.

FIG. 5 schematically illustrates part of the data processing operations controlled by the JAVA® decoder 12 when encountering a bytecode which performs a write to the JAVA® Local Variable 0. At step 40 the JAVA® Decoder identifies such a bytecode. At step 42 a new data value is written to R4 as specified by the bytecode concerned. At step 44 this new data value is also written to the memory location storing the JAVA® Local Variable 0 to effectively provide write-through caching of that data value within the register R4.

It will be appreciated that FIGS. 4 and 5 have illustrated processing in the form of flow diagrams. In practice it will be understood that the JAVA® decoder 12 will typically include a state machine which controls such processing operations to occur whether these occur in the particular sequence illustrated or in parallel or in some other way. The JAVA® decoder 12 will typically also control many other aspects of the operation of the data processing apparatus 2 which are required to execute that JAVA® bytecode, but which are not in themselves relevant to the present technique of write-through caching of a JAVA® Local Variable.

Figure 6:
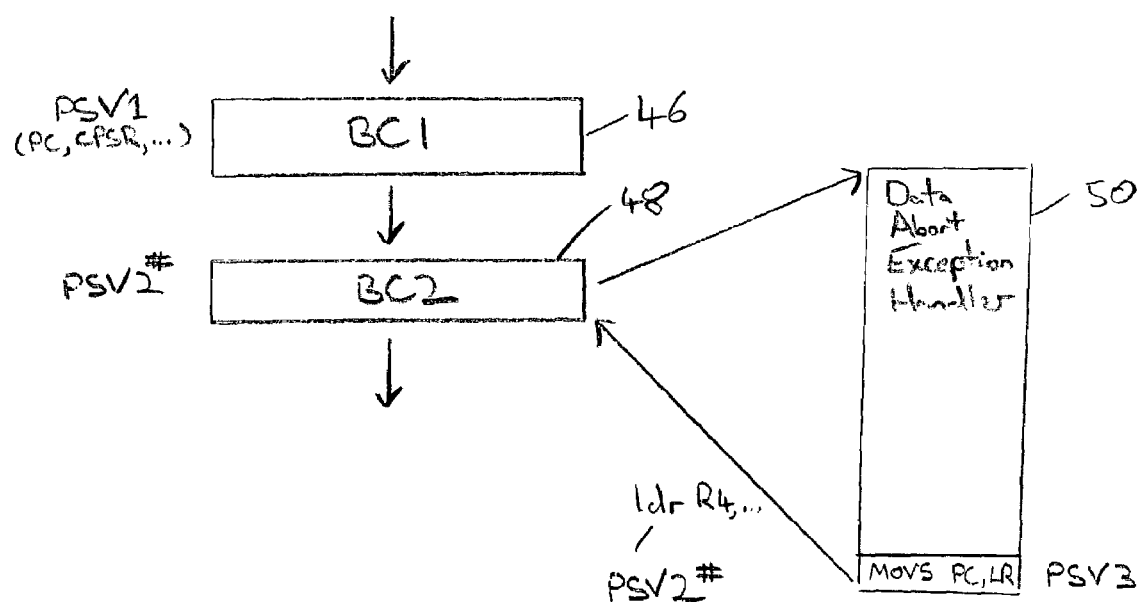
FIG. 6 schematically illustrates the taking of an exception during the first mode and the associated programming status variables.

FIG. 6 schematically illustrates a sequence of JAVA® bytecodes 46, 48 which are being decoded by the JAVA® decoder 12. As is known for data processing apparatus, such as ARM based microprocessors, there are processing status variables associated with the data processing apparatus as it executes each instruction and performs each operation. As an example, such processing status variables may include the program counter value, flags representing the outcome of previous operations, the current operational mode and the like. Reference may be made to the known ARM Architecture for further examples of such processing status variables.

As illustrated in FIG. 6, the execution of the bytecode 46 has a set of such processing status variables PSV1. The next bytecode 48 has a set of these processing status variables PSV2. During the execution of the bytecode 48 an exception occurs, such as a data abort exception causing the system to refer to a data abort handler, e.g. a exception handling software routine in ARM code 50. At the end of such an exception handling routine, a return is made to the instruction which caused that abort/exception to occur. This is typically made as is illustrated in the last instruction of the abort routine 50 by restoring a register value back to the program counter. This MOVS instruction will have its own processing status variables PSV3 associated with it.

When jumping back to a different mode of operation, in this case, JAVA® decoding, the write-through cached JAVA® Local Variable 0 needs to be restored to register R4 and accordingly the JAVA® decoder 12 will cause an operation to occur which is the equivalent of a load to this register R4 from the appropriate memory location. In order to assist with trouble free operation in these circumstances, the loading of this data value back into R4 should have associated with it as an operation the processing status variables value PSV2 corresponding to the original exception causing the bytecode 48 rather than the processing status variables PSV3 which would otherwise be associated with the last instruction within the exception handler 50. Thus, if the reload of R4 itself results in an abort, then the processing status variables PSV2 which will be stored at that point will be the correct ones which are required to resume proper operation at the bytecode 48 when that further abort is dealt with.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

The invention claimed is:

1. Apparatus operable in a first mode to perform processing operations specified by virtual machine bytecodes and operable in a second mode to perform processing operations specified by other instructions, said apparatus comprising:
   a register bank for storing data values to be manipulated;
   processing logic for performing processing operation upon data values stored in said register bank; and
   a virtual machine bytecode decoder operable in said first mode to store a copy of a virtual machine local variable held in a memory location within a register of said register bank; wherein
   said virtual machine bytecode decoder, when decoding a virtual machine bytecode which reads said virtual machine local variable, for reading said virtual machine local variable from said register and, when decoding a virtual machine bytecode which writes said virtual machine local variable, for writing said virtual machine local variable to said register and to said memory location.

2. Apparatus as claimed in claim 1, wherein when entering said first mode, said virtual machine local variable is loaded to said register.

3. Apparatus as claimed in claim 1, wherein when returning from an exception handling operation to said first mode, said virtual machine local variable is loaded to said register.

4. Apparatus as claimed in claim 3, wherein processing status variables store values representing processing status of said apparatus and when returning from an exception handling operation to said first mode, processing status variables are restored to those when the exception occurred.

5. Apparatus as claimed in claim 4, wherein when performing a load operation to load said virtual machine local variable to said register when returning from said exception, processing status variables corresponding to those when said exception occurred are associated with said load operation should a further exception occur during said load operation.

6. Apparatus as claimed in claim 1, wherein said virtual machine local variable is a pointer to a current virtual machine method.

7. A method of controlling a data processing apparatus to be operable in a first mode to perform processing operations specified by virtual machine bytecodes and to be operable in a second mode to perform processing operations specified by other instructions, said method comprising the steps of:
   storing data values to be manipulated in a register bank;
   performing processing operation upon data values stored in said register bank; and
   in said first mode, storing a copy of a virtual machine local variable held in a memory location within a register of said register bank; wherein
   when decoding a virtual machine bytecode which reads said virtual machine local variable, reading said virtual machine local variable from said register and, when decoding a virtual machine bytecode which writes said virtual machine local variable, writing said virtual machine local variable to said register and to said memory location.

8. A method as claimed in claim 7, wherein when entering said first mode, said virtual machine local variable is loaded to said register.

9. A method as claimed in claim 7, wherein when returning from an exception handling operation to said first mode, said virtual machine local variable is loaded to said register.

10. A method as claimed in claim 9, wherein processing status variables store values representing processing status of said data processing apparatus and when returning from an exception handling operation to said first mode, processing status variables are restored to those when the exception occurred.

11. A method as claimed in claim 10, wherein when performing a load operation to load said virtual machine local variable to said register when returning from said exception, processing status variables corresponding to those when said exception occurred are associated with said load operation should a further exception occur during said load operation.

12. A method as claimed in claim 7, wherein said virtual machine local variable is a pointer to a current virtual machine method.

* * * * *